N. R. STREETER.
MEAT AND FOOD CUTTER.
APPLICATION FILED DEC. 12, 1913.

1,149,966.

Patented Aug. 10, 1915.

Witnesses
C. W. P. Newbold
R. M. Smith

Inventor
N. R. Streeter
By A. Randolph Jr.
Attorney

UNITED STATES PATENT OFFICE.

NELSON R. STREETER, OF SYRACUSE, NEW YORK.

MEAT AND FOOD CUTTER.

1,149,966. Specification of Letters Patent. Patented Aug. 10, 1915.

Application filed December 12, 1913. Serial No. 806,314.

*To all whom it may concern:*

Be it known that I, NELSON R. STREETER, a citizen of the United States, residing at Syracuse, in the county of Onondaga and State of New York, have invented certain new and useful Improvements in Meat and Food Cutters; and I do hereby declare the following to be a full, clear, and exact description of the invention, such as will enable others skilled in the art to which it appertains to make and use the same.

This invention relates to improvements in meat and food cutters or grinders, and has for its primary object to provide a device of this nature having a stationary cutting element removably secured to the discharge end of the body and having blades alined with longitudinal ribs formed within the body.

Another object of the invention is to provide a meat and food cutter having a novelly formed stationary cutting element which may be easily and quickly detached to facilitate sharpening and which may be quickly reattached to the body in its proper position.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1:
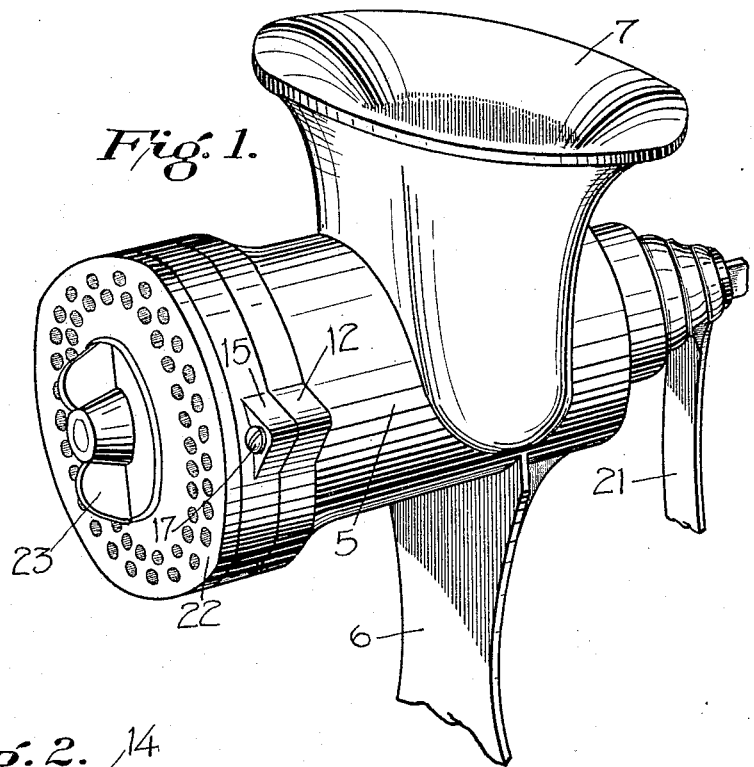
Figure 2:
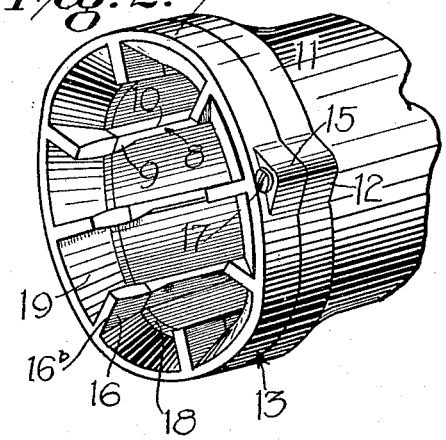
Figure 3:
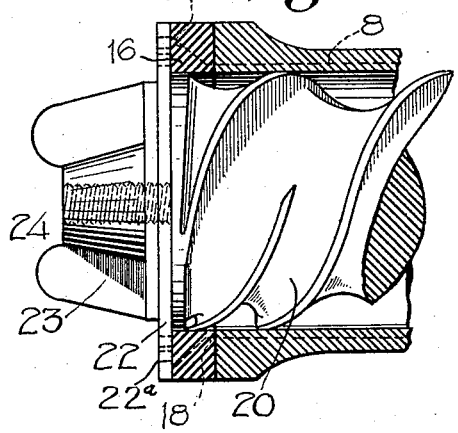

Figure 1 is a perspective view of my improved food cutter, Fig. 2 is a fragmentary perspective view, showing the discharge end of the body and the stationary cutting element which is secured thereto, and Fig. 3 is a fragmentary longitudinal sectional view through the discharge end of the cutter, with parts thereof shown in elevation.

Referring in detail to the drawings by numerals, 5 designates, as an entirety, the cylindrical body of my improved food cutter, said body being formed integrally with an arm or bracket 6 and a hopper 7. The body is formed internally with a plurality of longitudinal cutting and feed ribs 8, which extend parallel to one another, which terminate flush with the outer end of the body, and which are slightly enlarged adjacent their outer terminals, as indicated by the numeral 9. The ribs 8 are formed with straight cutting edges 10 extending parallel with the longitudinal axis of the body 5 and are gradually increased in thickness toward the discharge end of the hopper, as indicated at 9, on the sides opposite the cutting edges 10 so as to reinforce the free ends of the ribs and slightly compress the material passing through the food cutter before it is operated upon by the rotary cutter, to be hereinafter described. The outer end of the body is externally enlarged to form a flange indicated by the numeral 11 which is provided with a pair of diametrically opposed apertured ears 12.

A relatively stationary cutting element, generally designated 13, is removably secured to the discharge end of the body and may be quickly detached therefrom and connected thereto. This cutting element comprises a ring 14, a pair of apertured ears 15, and a plurality of cutting blades 16 corresponding in number to the number of cutting and feeding ribs 8. The external diameter of the ring is substantially equal to that of the flange 11, and the ears 15 are formed with openings which register with openings formed in the ears 12, and the cutting element is secured in position by screws 17 which are threaded through these ears. The internal diameter of the ring adjacent its inner face is equal to the internal diameter of the body 5, as indicated by the numeral 18, but the diameter adjacent the outer face of the ring is somewhat greater since the ring is beveled, as indicated by the numeral 19. The blades 16 extend radially from the interior of the ring 14, have their outer terminals squared with the outer face of the ring and their inner terminals abutting the ends of the longitudinal ribs 10. It will be noted upon reference to Fig. 2 that these blades are of the same width at their inner ends as the adjacent enlarged ends 9 of the ribs 8 and taper outward slightly. Each blade 16 is formed with two cutting edges 16$^a$ and 16$^b$, the edge 16$^a$ being disposed parallel with the longitudinal axis of the body 5 and forming a continuation of the cutting edge 10 of the alined rib 8, and the edge 16$^b$ being disposed at right angles to the edge 16$^a$ or radially of the body 5, terminating flush with the outer edge of the ring 14 and adapted to coöperate with the rotary cutter.

A feed screw 20 is positioned within the cutter and has its outer end in the plane of the outer face of the cutting element 13. This screw is rotated by means of an arm 21 and has attached to its outer end a rotary cutter 22 in the form of an apertured disk. The rotary cutter 22 is secured to the end of the screw 20 by a wing nut 23 fitted upon a reduced screw-threaded projection 24 carried by the screw 20. The cutter 22 is a flat disk preferably stamped from sheet metal and having a plurality of perforations $22^a$ formed in that position which contacts with the cutting edges $16^b$ of the blades 16 during the operation of the cutter.

From the foregoing it will be seen that the cutting blades 16 are practically extensions of the longitudinal ribs 10, and that they coöperate with the rotatable cutter 22 to efficiently cut food as it is forced through the delivery end of the cutter by the screw 20.

In the manufacture of my improved food cutter, the body 5 and the parts integrally connected therewith are preferably cast of iron which is a comparatively cheap material, and the cutting element 13 is formed of tool steel, which insures efficient operation. The greatest wear comes on the cutters 13 and 22, and therefore it will be appreciated that it is essential to have these members formed of the best possible material, such as tool steel, whereas the remainder of the cutter may, as before stated, be formed of cast iron or any other suitable material.

From the foregoing description taken in connection with the accompanying drawings, it will be seen that I have provided a meat and food cutter having a removable cutting element which may be easily and quickly attached to and detached from the delivery end of the body, and which coöperates with a feed screw and a rotary cutter to produce a highly efficient machine.

While I have shown and described the preferred embodiment of my invention, it will be understood the minor changes in construction, combination and arrangement of parts may be made without departing from the spirit and scope of the invention as claimed.

Having thus described my invention, I claim:—

In a meat and food cutter, a cylindrical body, a plurality of flat blades arranged interiorly of said cylindrical body having straight cutting edges extending parallel with the longitudinal axis of said body, the ends of said blades at the discharge end of said body being increased in thickness on the sides opposite the cutting edges, a relatively stationary cutter element secured to the discharge end of said body, a plurality of flat blades extending radially and inwardly of said cutter element and having cutting edges extending in alinement with the first mentioned cutting edges.

In testimony whereof I affix my signature in presence of two witnesses.

NELSON R. STREETER.

Witnesses:
W. C. DAVIS,
R. M. SMITH.